United States Patent

Havel

[15] 3,663,759

[45] May 16, 1972

[54] AUTOMATIC PHASE CIRCUIT

[72] Inventor: Joseph F. Havel, Framingham, Mass.

[73] Assignee: Raytheon Company, Lexington, Mass.

[22] Filed: May 21, 1970

[21] Appl. No.: 41,663

Related U.S. Application Data

[63] Continuation of Ser. No. 762,109, Oct. 2, 1967, abandoned.

[52] U.S. Cl. ........ 179/15 BA

[51] Int. Cl. ........ H04j 3/06

[58] Field of Search ........ 179/15 BA, 15 BY

[56] References Cited

UNITED STATES PATENTS

| | | | |
|---|---|---|---|
| 3,281,538 | 10/1966 | Harding | 179/15 BY |
| 3,310,631 | 3/1967 | Brown | 179/15 BY |

*Primary Examiner*—Ralph D. Blakeslee

*Attorney*—Harold A. Murphy and Joseph D. Pannone

[57] ABSTRACT

An automatic phase circuit for interleaving digital data trains, one train having an arbitrary phase relationship with a clock signal, which circuit employs a gating technique thereby eliminating the need for any delay lines.

13 Claims, 2 Drawing Figures

Patented May 16, 1972 3,663,759

2 Sheets-Sheet 1

INVENTOR
JOSEPH F. HAVEL
BY Irving S. Rappaport
ATTORNEY

Patented May 16, 1972

3,663,759

2 Sheets-Sheet 2

INVENTOR
JOSEPH F. HAVEL
BY Irving S. Rappaport
ATTORNEY

AUTOMATIC PHASE CIRCUIT

This Application is a continuation of application Ser. No. 762,109, filed Oct. 2, 1967, and now abandoned.

BACKGROUND OF THE INVENTION

It is desirable in multiplex and pulse code multiplication (PCM) equipment to interleave two or more digital data trains from various sources having arbitrary phase relationships. Prior art phasing circuits employ expensive and space consuming delay lines. In such prior art circuits, the PCM transitions were compared with a sampling pulse and a flip flop control gating circuit. This gating circuit would add or delete a delay line in the data path. Such delay lines are physically quite large and require additional packing space. These circuits also required special diode gates.

An object of the present invention is to provide an automatic phase circuit for interleaving two digital data trains having the same bit rate, with one of the trains having an associated clock pulse and the other having no time relationship to the clock. The circuit of the present invention enables the proper interleaving of two PCM data trains in a multiplexer. Another possible application of such a circuit would be in a radio coupler in a commercial PCM telephone system. The circuit of the present invention may employ integrated or discrete circuits and the embodiment described below employs integrated diode-transistor logic circuits.

SUMMARY OF THE INVENTION

The above and other objects and advantages of the present invention are achieved by providing an automatic phase circuit for interleaving digital data trains having the same bit rate, one train having an arbitrary phase relationship with a clock signal, the circuit comprising means for generating a narrow pulse at the data rate; means for sampling incoming data with the narrow pulse; means for storing the sampled data; means for determining when the sampling pulse coincides with a data transition and for shifting the sampling pulse away from such a transition; and means for interleaving the data trains.

DESCRIPTION OF THE PREFERRED EMBODIMENT

Figure 1:
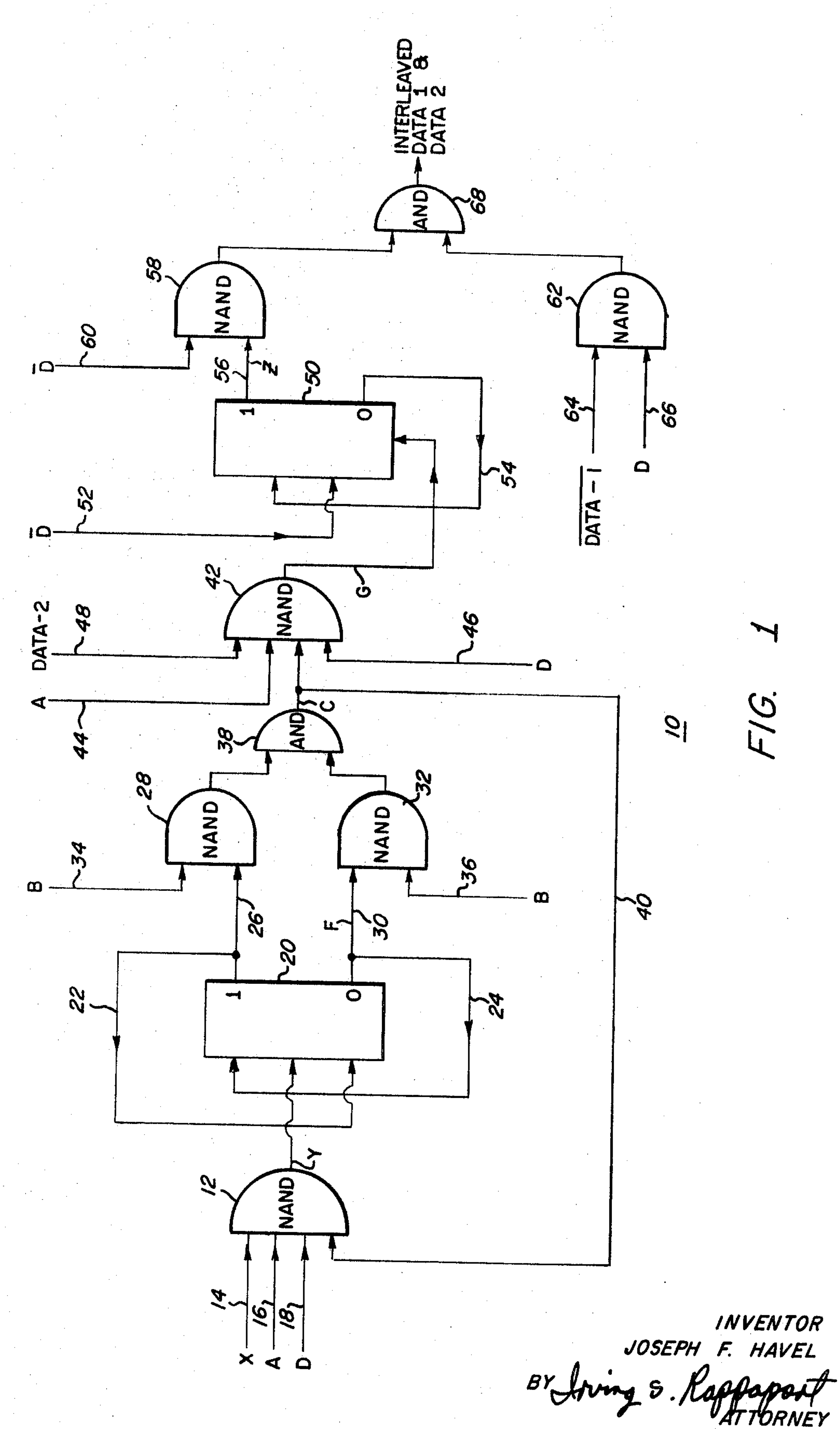
FIG. 1 shows a logic diagram of the automatic phase circuit of the present invention.
Figure 2:
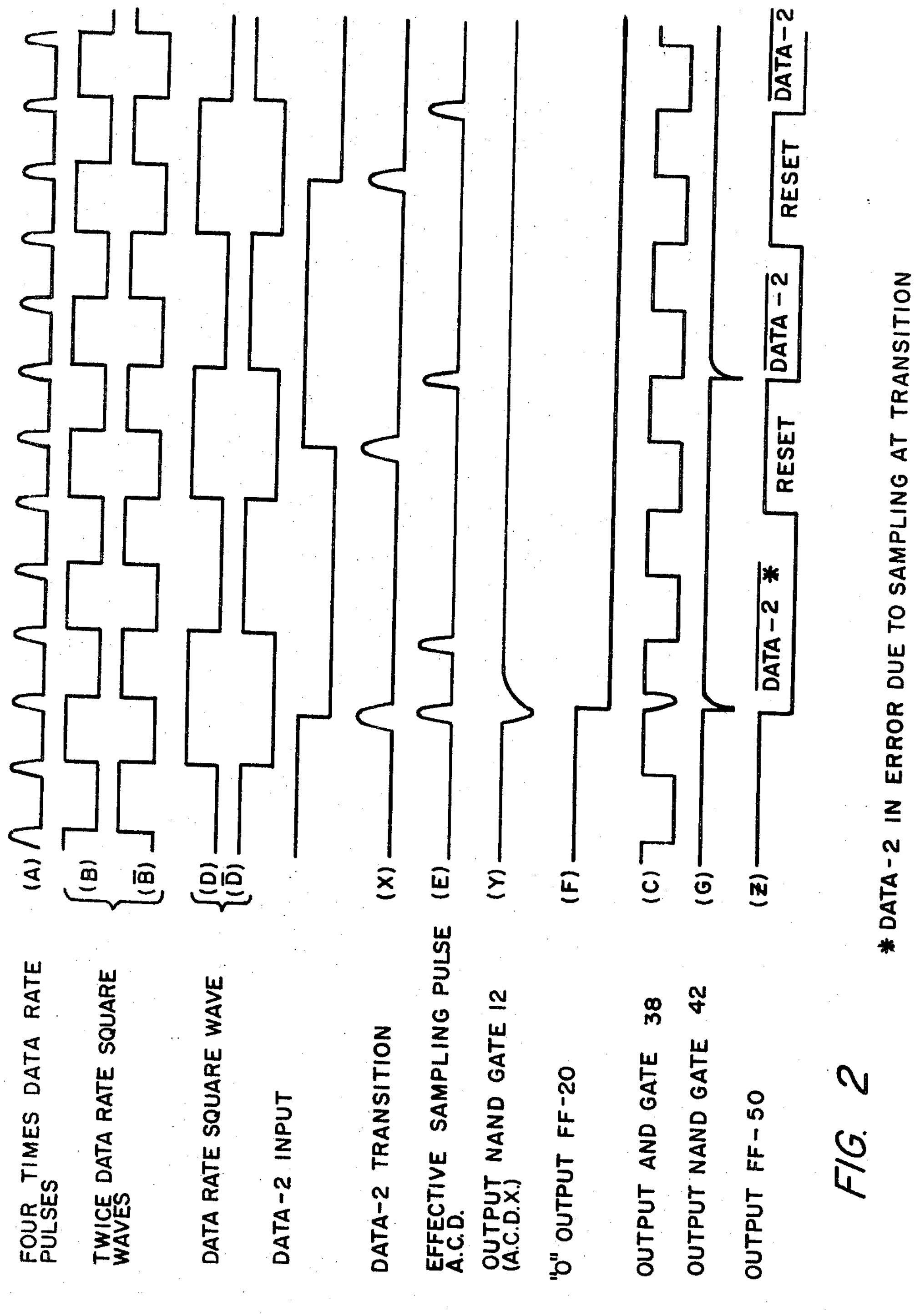
FIG. 2 shows the timing waveforms of the automatic phase circuit shown in FIG. 1.

FIG. 1 shows a logic diagram of an automatic phase circuit 10 of the present invention. The circuit 10 is made up of a plurality of NAND gates, AND gates and flip flops. A NAND gate is basically an AND gate and an inverter. The circuit 10 includes a NAND gate 12 which has the signals X, A and D applied thereto respectively via lines 14, 16 and 18. The D signal applied on line 18 is a data rate square wave as shown in FIG. 2. The A signal which is the clocking signal and which is applied on line 16 comprises pulses whose frequency is four times the data rate. The X signal, which is applied on line 14, is made up of the data transitions from one level to another of the data trains with no time relationship to the clocking signal A to be interleaved, hereinafter referred to as DATA–2. The A and X signals are also shown in the timing wave forms in FIG. 2.

The output Y of the NAND gate 12, which is shown in FIG. 2, is applied to the flip flop 20. The flip flop 20 includes feedback lines 22 and 24 which permit the flip flop to be complemented upon receipt of a pulse input. The output from the flip flop 20 is fed to parallel-connected NAND gates 28 or 32 via the "one" state or "zero" state lines 26 or 30 respectively. Also applied to the input of the NAND gates 28 and 32 are the signals B and $\overline{B}$ (the inverted B signal) via lines 34 and 36 respectively. The output of the NAND gates 28 and 32 are both applied to an AND gate 38 whose output signal C is fed back to the input of NAND gate 12 via feedback loop 40.

The signals B and $\overline{B}$ are square waves at twice the data rate and the output C from the AND gate 38 is either the B or $\overline{B}$ signal as selected by the state of the flip flop 20. The signal C is applied to a NAND gate 42. Also applied to NAND gate 42 are the signals A and D via lines 44 and 46 respectively. Finally, the DATA–2 data train is applied to the input of NAND gate 42 via line 48. The output signal G from the NAND gate 42 is applied to a flip flop 50. Also applied to the flip flop 50 via line 52 is a $\overline{D}$ signal, which is the inverted D signal. A feedback loop 54 from the zero level output of the flip flop 50 is provided to enable the reset of the flip flop at the appropriate time with the $\overline{D}$ signal applied via line 52. The one level output Z from the flip flop 50 is applied to NAND gate 58 via line 56. Also applied to the NAND gate 58 is the $\overline{D}$ signal via line 60.

The other data train which is to be interleaved with the DATA–2 train is applied in its inverted version, $\overline{\text{DATA–1}}$, to a NAND gate 62 via line 64. Also applied to the NAND gate 62 on line 66 is the D signal. The output of the NAND gates 58 and 62 are applied to an AND gate 68, whose output represents the interleaved DATA–1 and DATA–2 data trains.

The general operation of the automatic phase circuit 10 is as follows: The incoming DATA–2 signal is sampled with a narrow pulse at the data rate in NAND gate 42, and read in and stored in flip flop 50 for resampling and interleaving with the other data signal; DATA–1. The flip flop 50 is reset before the next sample of data is read in and stored. If the sampling pulse coincides with the data transitions, as represented by the X signal, the sampling pulse is automatically shifted away from the transition. This shifting of the sampling pulse away from a transition is shown in FIG. 2. Describing the detailed operation of the circuit, one incoming digital data train, DATA–2, which has an arbitrary phase is sampled in NAND gate 42 with a narrow pulse E at the data rate. This narrow pulse E as shown in FIG. 2 is derived from a narrow clocking signal comprising positive pulses four times the data rate (A signal), a square wave at the data rate (D signal) and a square wave twice the data rate (C signal), which is derived from the NAND gates 28 and 32. The D signal is a square wave at the data rate which enables the NAND gates for a period of time one-half the data rate. The DATA–2 signal train has absolutely no phase relationship with the clocking signal A, while the DATA–1 signal train has a fixed phase relationship with the clocking signal A. The DATA–1 and DATA–2 signal trains are, however, related in that they both have the same bit rate. The signals A, C and D are applied to the NAND gate 12 via the lines 16, 40 and 18 respectively. The positive pulse transitions X of the DATA–2 input signal are also applied to the NAND gate 12.

If the phase of the DATA–2 signal train and the sampling pulse E is such that a coincidence does exist, a pulse output signal Y is produced in the output of NAND gate 12. This output signal Y complements flip flop 20. It is desired not to sample the DATA–2 signal during the data transition in order to avoid transmission errors. Therefore, to avoid sampling during a data transition, the sampling pulse E is combined with the DATA–2 transition by applying the signals A, C and D to the NAND gate 12. The feedback lines 22 and 24 are provided with the flip flop 20 for the purpose of permitting the flip flop to be complemented. When there is a negative transition on the trailing edge of the clock pulse, the flip flop 20 is complemented. The initial state of flip flop 20 is completely arbitrary. The outputs of the flip flop 20 on lines 26 and 30 are applied to NAND gates 28 and 32 respectively. The F signal represents the zero output of flip flop 20. The other two inputs to the NAND gates 28 and 32 are both phases B and $\overline{B}$ of a square wave at twice the data rate. The outputs of the NAND gates 28 and 32 are combined in the AND gate 38 to form the C signal. The state of the flip flop 20 controls which phase of the B signal will be applied to the NAND gates 12 and 42. This action shifts the effective sampling points one-fourth the period of the data rate and away from the transition X of the DATA–2 signal. The shift may be either forward or backward depending upon the previous state of the flip flop 20.

However, the information from the NAND gate 42 must still be interleaved with the other digital data signal, DATA–1. Since the output of the sampler, NAND gate 42, is a narrow pulse signal G, when the DATA–2 signal is at a one level, this level must be converted to a ½ width bit at the data rate. This is accomplished by applying the negative output pulse signal G from NAND gate 42 to the direct clear input of flip flop 50. The sample data pulse from the NAND gate 42 is applied to the flip flop 50 which is normally in a one state and is switched to a zero state when the DATA–2 signal is in a one state. A one state of DATA–2 input will appear as a zero pulse starting at the sampling pulse and terminating at the one to zero transition of the $\overline{D}$ signal. A zero level of DATA–2 input will merely be a one level signal. No matter which B waveform was used for sampling, the pulse of data will encompass the one level portion of the $\overline{D}$ signal. The feedback loop 54 of the flip flop 50 enables the reset of the flip flop 50 back to a one state upon passage of the trailing edge of the $\overline{D}$ signal.

The output from the flip flop 50 on line 56 is sampled in NAND gate 58 with a one level pulse of the $\overline{D}$ signal. When the $\overline{D}$ signal is at a one level, the output of the flip flop 50 is inverted to give a ½ width pulse of the DATA–2 input. The zero level portion of the $\overline{D}$ signal inhibits the NAND gate 58.

The other data train to be interleaved, DATA–1, is inverted and applied to NAND gate 62. NAND gate 62 is enabled by a one level pulse of the D waveform. The $\overline{\text{DATA–1}}$ signal is then sampled with the D signal in a similar manner as the DATA–2 signal is sampled with the $\overline{D}$ signal in NAND gate 58. Since the outputs of the NAND gates 58 and 62 are alternately inhibited, combining their outputs in the NAD gate 68 produces the interleaved DATA–1 and DATA–2 train.

Since the DATA–1 signal had a fixed phased relationship with the clocking signal A, it was not necessary to derive the DATA–1 signal in the same manner as the DATA–2 signal. However, were this phase relationship non-existant, then the DATA–1 signal could be derived in a similar manner as the DATA–2 signal. Since the interleaving rate is only twice the data rate, four times data rate may not be available. The circuit of the present invention could be used with only the twice data rate signal. In such a case, the B and $\overline{B}$ signals could be replaced by alternate phase pulses at twice the data rate.

Although the preferred embodiment shows the use of two AND gates 38 and 68, in alternate embodiments of the present invention these AND gates may not be necessary. If a passive element controls the one level and an active element controls the zero levels of the NAND gates of the circuit, then direct connections of the outputs of the NAND gates 28 and 32 and 58 and 62 may be made without using the AND gates 38 and 68. However, in the more generalized version of the present invention, the AND gates 38 and 68 would be employed and could be any standard AND gates. An operating version of the circuit shown in FIG. 1 was built without the AND gates 38 and 68 and the following elements were used:

| | |
|---|---|
| NAND gates **12** and **42** | Signetics NAND gate **101** |
| NAND gates **28–32** and **58–62** | Signetics dual NAND gate **115** |
| Flip flop **20** | Signetics flip flop **124** |
| Flip flop **50** | Signetics flip flop CS704 |

The automatic phase circuit 10 of the present invention could be used in multiplex equipment which interleaves two or more data trains at the same bit rate from various sources with arbitrary phase relationships. An example of a commercial application of the present invention might be in a radio coupler in a commercial PCM telephone system. The logic elements using the present invention were integrated diode-transistor logic circuits but the use of other integrated or discrete circuits is feasible.

It should be understood, of course, that the foregoing disclosure relates to only a preferred embodiment of the invention and that numerous modifications or alterations may be made therein without departing from the spirit and the scope of the invention as set forth in the appended claims.

I claim:

1. In combination:
means for sampling the contents of a first signal channel within predetermined time intervals;
means responsive to the presence of a signal within one of said time intervals for shifting said time intervals relative to the occurrence of signals of a second signal channel; and
means coupled to said sampling means for injecting samples of signals from said second signal channel between at least some of said signal samples of said first channel.

2. A communication system in accordance with claim 1 wherein said first channel constitutes a portion of a system for receiving remotely generated pulses.

3. A communication system in accordance with claim 2 wherein the pulses in said first channel have a predetermined rate.

4. A communication system in accordance with claim 3 wherein said means for injecting said signal samples comprises means for storing signal samples.

5. A communication system comprising:
means for generating a train of digital data at a predetermined rate;
means for generating a pulse which is narrower than the spaces between said digital data;
means for sampling said data with said pulse;
means for storing the sampled data;
means for determining when the sampling pulse coincides with a data pulse and for time shifting the sampling pulse away from said data pulse; and
means for injecting a data pulse from a separate source into the time slot represented by said sampling pulse.

6. An automatic phase circuit for interleaving digital data trains having the same bit rate, one train having an arbitrary phase relationship with a clock signal, the circuit comprising:
means for generating a narrow pulse at the data rate;
means for sampling incoming data with the narrow pulse;
means for storing the sampled data;
means for determining when the sampling pulse coincides with a data transition and for time shifting the sampling pulse away from such a transition; and
means for interleaving the data trains;
said means for generating a narrow pulse including a data rate signal, a clock signal comprising pulses at four times the data rate signal and a signal at twice the data rate, said signals being combined to form the narrow pulse for sampling with one data train.

7. An automatic phase circuit as set forth in claim 6 wherein said means for sampling the incoming data with the narrow pulse includes a NAND gate.

8. An automatic phase circuit as set forth in claim 6 wherein an automatic phase circuit for interleaving digital data trains having the same bit rate, one train having an arbitrary phase relationship with a clock signal, the circuit comprising:
means for generating a narrow pulse at the data rate;
means for sampling incoming data with the narrow pulse;
means for storing the sampled data;
means for determining when the sampling pulse coincides with a data transition and for time shifting the sampling pulse away from such a transition; and
means for interleaving the data trains;
said means for determining when the sampling pulse coincides with a data transition and for shifting the sampling pulse away from such a transition comprising a single NAND gate which has applied thereto a data rate signal, a clock signal at four times the data rate and signal representative of the transitions of a data train, a switch to which the NAND gate output is applied, a pair of parallel connected NAND gates for receiving the switch outputs, means for combining the parallel connected NAND gate outputs, and control means for applying the combined output of said single NAND gate.

9. An automatic phase circuit as set forth in claim 6 wherein an automatic phase circuit for interleaving digital data trains having the same bit rate, one train having an arbitrary phase relationship with a clock signal, the circuit comprising:

means for generating a narrow pulse at the data rate;

means for sampling incoming data with the narrow pulse;

means for storing the sampled data;

means for determining when the sampling pulse coincides with a data transition and for time shifting the sampling pulse away from such transition; and means for interleaving the data trains;

said interleaving means include a pair of parallel-connected NAND gates each of which receives one of the data trains and means for combining said data trains to result in the interleaved data train.

10. An automatic phase circuit for interleaving digital data trains having the same bit rate, one train having an arbitrary phase relationship with a clock signal, the circuit comprising:

means for generating a narrow pulse at the data rate including a data rate signal, a clock signal comprising pulses at four times the data rate signal and a signal at twice the data rate, said signals being combined to form the narrow pulse for sampling with one data train;

a NAND gate for sampling the one data train with the narrow pulse;

means for storing the sampled data train;

means for determining when the sampling pulse coincides with a data transition and for shifting the sampling pulse away from such a transition; and means for interleaving the sampled data train with the other data train.

11. An automatic phase circuit for interleaving digital data trains having the same bit rate, one train having an arbitrary phase relationship with a clock signal, the circuit comprising:

means for generating a narrow pulse at the data rate;

a NAND gate for sampling one of the data trains with the narrow pulse;

means for storing the sampled data train;

means for determining when the sampling pulse coincides with a data transition and for shifting the sampling pulse away from such a transition, said means including;

a single NAND gate which has applied thereto a data rate signal, a clock signal at four times the data rate and a signal representative of the transitions of the sampled data rate, a switch to which the single NAND gate output is applied, a pair of parallel-connected NAND gates for receiving the switch outputs;

means for combining the parallel-connected NAND gate outputs;

control means for applying the combined output to said single NAND gate; and means for interleaving the sampled data train with the other data train.

12. An automatic phase circuit for interleaving digital data trains having the same bit rate, one train having an arbitrary phase relationship with a clock signal, the circuit comprising:

means for generating a narrow pulse at the data rate including a data rate signal, a clock signal comprising pulses at four times the data rate signal and a signal at twice the data rate, said signals being combined to form the narrow pulse for sampling with one data train;

a NAND gate for sampling the one data train with the narrow pulse;

flip-flop means for storing the sampled data train;

means for determining when the sampling pulse coincides with a data transition and for shifting the sampling pulse away from such a transition;

a pair of parallel-connected NAND gates each of which receives one of the data trains; and means for combining said data trains to result in the interleaved data train.

13. An automatic phase circuit as set forth in claim 12 wherein said means for determining when the sampling pulse coincides with a data transition and for shifting the sampling pulse away from such a transition includes:

a single NAND gate which has applied thereto a data rate signal, a clock signal at four times the data rate and signal representative of the transitions of a data train;

a switch to which the NAND gate output is applied;

a pair of parallel connected NAND gates for receiving the switch outputs;

means for combining the parallel connected NAND gate output; and control means for applying the combined output to said single NAND gate.

* * * * *